United States Patent
Yamada

(10) Patent No.: US 9,602,390 B2
(45) Date of Patent: Mar. 21, 2017

(54) APPARATUS AND METHOD FOR DETERMINING OPTIMUM ROUTING IN A COMMUNICATION NETWORK

(71) Applicant: FUJITSU LIMITED, Kawasaki-shi, Kanagawa (JP)

(72) Inventor: Kenji Yamada, Onojou (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 14/339,986

(22) Filed: Jul. 24, 2014

(65) Prior Publication Data
US 2015/0049614 A1 Feb. 19, 2015

(30) Foreign Application Priority Data
Aug. 14, 2013 (JP) .................. 2013-168445

(51) Int. Cl.
*H04L 12/721* (2013.01)
*H04W 84/18* (2009.01)

(52) U.S. Cl.
CPC .......... *H04L 45/124* (2013.01); *H04W 84/18* (2013.01)

(58) Field of Classification Search
None
See application file for complete search history.

(56) References Cited

U.S. PATENT DOCUMENTS 8,085,768 B1 * 12/2011 Hui .................. H04L 45/18
370/389
8,149,715 B1 * 4/2012 Goel .................. H04L 45/123
370/238
2003/0107992 A1 * 6/2003 Garcia-Luna-Aceves
.................. H04L 45/12
370/230
2003/0128687 A1 7/2003 Worfolk et al.
2007/0263628 A1 * 11/2007 Axelsson ............. H04L 45/00
370/392
2008/0101244 A1 * 5/2008 Liu ................. H04L 45/00
370/238

(Continued)

FOREIGN PATENT DOCUMENTS

JP 2003-536334 12/2003
JP 2006-526937 11/2006

(Continued)

*Primary Examiner* — Brandon Renner
*Assistant Examiner* — Jay Vogel
(74) *Attorney, Agent, or Firm* — Staas & Halsey LLP

(57) ABSTRACT

A node device receives first data communicated between the node device and adjacent node devices. The node device calculates a link cost between the node device and each of the adjacent node devices, based on the first data, and corrects the link cost using a first cost depending on communication performance of the each adjacent node device. The node device stores, in association with the each adjacent node device, a first integrated link-cost value obtained by adding the corrected link cost to a second integrated link-cost value that is obtained by summing up link costs along a communication route from a destination node device serving as a final destination of second data to the each adjacent node device. The node device transmits, to the adjacent node devices, the first data including the second integrated link-cost value and a second cost depending on communication performance of the node device.

13 Claims, 18 Drawing Sheets

(56) References Cited

U.S. PATENT DOCUMENTS

| | | | |
|---|---|---|---|
| 2009/0135716 A1* | 5/2009 | Veillette | G01D 4/004 370/221 |
| 2009/0168653 A1* | 7/2009 | St. Pierre | H04L 45/00 370/238 |
| 2011/0255429 A1* | 10/2011 | Carrera | H04W 24/06 370/252 |
| 2012/0120808 A1* | 5/2012 | Nandagopal | H04L 45/028 370/238 |
| 2015/0043661 A1* | 2/2015 | Okada | H04B 3/542 375/257 |

FOREIGN PATENT DOCUMENTS

| | | |
|---|---|---|
| WO | 01-95641 | 12/2001 |
| WO | WO2004/114690 | 12/2004 |

* cited by examiner

| NO. 1 | GD | LD | LINK COST INTEGRATED VALUE |
|---|---|---|---|
| NO. 1-1 | GW | R1 | 154 |
| NO. 1-2 | | B | 165 |
| NO. 1-3 | | | |

FIG. 6
Hello FRAME EXAMPLE
| AD HOC HEADER | TIME | Hello MESSAGE HEADER | Hello HEADER | ... | Hello HEADER | SIGNATURE | PADDING |
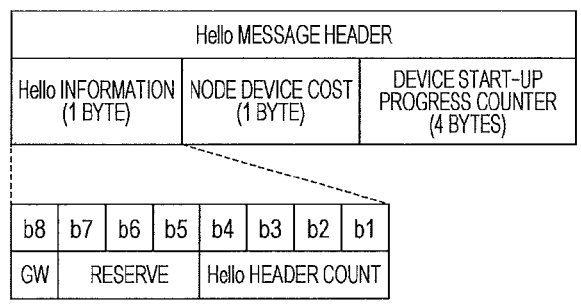
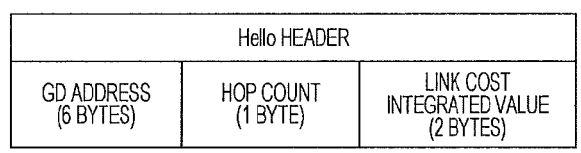

FIG. 10

LINK TABLE FOR NODE DEVICE R5

| ADJACENT NODE DEVICE | PRE-CORRECTION LINK COST | ADJACENT NODE DEVICE COST | POST-CORRECTION LINK COST |
|---|---|---|---|
| GW | 12 | 15 | 27 |
| R4 | 10 | 15 | 25 |

ROUTING TABLE FOR NODE DEVICE R5

| NO. 1 | GD | LD | LINK COST INTEGRATED VALUE | HOP COUNT |
|---|---|---|---|---|
| NO. 1-1 | GW | GW | 27 | 1 |
| NO. 1-2 | | R4 | ... | |
| NO. 1-3 | | | | |

Hello FRAME TRANSMITTED FROM NODE DEVICE R5

| Hello HEADER | | |
|---|---|---|
| GD ADDRESS = GW | HOP COUNT = 1 | LINK COST INTEGRATED VALUE = 27 |

FIG. 11

LINK TABLE FOR NODE DEVICE R4

| ADJACENT NODE DEVICE | PRE-CORRECTION LINK COST | ADJACENT NODE DEVICE COST | POST-CORRECTION LINK COST |
|---|---|---|---|
| R5 | 12 | 15 | 27 |
| R3 | 10 | 15 | 25 |

ROUTING TABLE FOR NODE DEVICE R4

| NO. 1 | GD | LD | LINK COST INTEGRATED VALUE | HOP COUNT |
|---|---|---|---|---|
| NO. 1-1 | GW | R5 | 52 | 2 |
| NO. 1-2 | | R3 | ... | |
| NO. 1-3 | | | | |

Hello FRAME TRANSMITTED FROM NODE DEVICE R4

| Hello HEADER | | |
|---|---|---|
| GD ADDRESS = GW | HOP COUNT = 2 | LINK COST INTEGRATED VALUE = 52 |

FIG. 12

LINK TABLE FOR NODE DEVICE R3

| ADJACENT NODE DEVICE | PRE-CORRECTION LINK COST | ADJACENT NODE DEVICE COST | POST-CORRECTION LINK COST |
|---|---|---|---|
| R4 | 10 | 15 | 25 |
| R2 | 10 | 15 | 25 |

ROUTING TABLE FOR NODE DEVICE R3

| NO. 1 | GD | LD | LINK COST INTEGRATED VALUE | HOP COUNT |
|---|---|---|---|---|
| NO. 1-1 | GW | R4 | 77 | 3 |
| NO. 1-2 | | R2 | ... | |
| NO. 1-3 | | | | |

Hello FRAME TRANSMITTED FROM NODE DEVICE R3

| Hello HEADER | | |
|---|---|---|
| GD ADDRESS = GW | HOP COUNT = 3 | LINK COST INTEGRATED VALUE = 77 |

FIG. 13

LINK TABLE FOR NODE DEVICE R2

| ADJACENT NODE DEVICE | PRE-CORRECTION LINK COST | ADJACENT NODE DEVICE COST | POST-CORRECTION LINK COST |
|---|---|---|---|
| R3 | 10 | 15 | 25 |
| R1 | 10 | 15 | 25 |

ROUTING TABLE FOR NODE DEVICE R2

| NO. 1 | GD | LD | LINK COST INTEGRATED VALUE | HOP COUNT |
|---|---|---|---|---|
| NO. 1-1 | GW | R3 | 102 | 4 |
| NO. 1-2 | | R1 | ... | |
| NO. 1-3 | | | | |

Hello FRAME TRANSMITTED FROM NODE DEVICE R2

| Hello HEADER | | |
|---|---|---|
| GD ADDRESS = GW | HOP COUNT = 4 | LINK COST INTEGRATED VALUE = 102 |

FIG. 14

LINK TABLE FOR NODE DEVICE R1

| ADJACENT NODE DEVICE | PRE-CORRECTION LINK COST | ADJACENT NODE DEVICE COST | POST-CORRECTION LINK COST |
|---|---|---|---|
| R2 | 10 | 15 | 25 |
| A | 12 | 15 | 27 |

ROUTING TABLE FOR NODE DEVICE R1

| NO. 1 | GD | LD | LINK COST INTEGRATED VALUE | HOP COUNT |
|---|---|---|---|---|
| NO. 1-1 | GW | R2 | 127 | 5 |
| NO. 1-2 | | A | ... | |
| NO. 1-3 | | | | |

Hello FRAME TRANSMITTED FROM NODE DEVICE R1

| Hello HEADER | | |
|---|---|---|
| GD ADDRESS = GW | HOP COUNT = 5 | LINK COST INTEGRATED VALUE = 127 |

FIG. 15

LINK TABLE FOR NODE DEVICE A

| ADJACENT NODE DEVICE | PRE-CORRECTION LINK COST | ADJACENT NODE DEVICE COST | POST-CORRECTION LINK COST |
|---|---|---|---|
| R1 | 12 | 15 | 27 |
| B | 10 | 60 | 70 |

ROUTING TABLE FOR NODE DEVICE A

| NO. 1 | GD | LD | LINK COST INTEGRATED VALUE | HOP COUNT |
|---|---|---|---|---|
| NO. 1-1 | GW | R1 | 154 | 6 |
| NO. 1-2 | | B | 165 | 3 |
| NO. 1-3 | | | | |

Hello FRAME TRANSMITTED TO NODE DEVICE A

| Hello HEADER | | |
|---|---|---|
| GD ADDRESS = GW | HOP COUNT = 6 | LINK COST INTEGRATED VALUE = 154 |

APPARATUS AND METHOD FOR DETERMINING OPTIMUM ROUTING IN A COMMUNICATION NETWORK

CROSS-REFERENCE TO RELATED APPLICATION

This application is based upon and claims the benefit of priority of the prior Japanese Patent Application No. 2013-168445, filed on Aug. 14, 2013, the entire contents of which are incorporated herein by reference.

FIELD

The embodiment discussed herein is related to apparatus and method for determining optimum routing in a communication network.

BACKGROUND

In an ad hoc network, node devices autonomously form a network with one another. Because communication is autonomously performed, users do not have to set communication routes at any time, and infrastructure and communication terminals dedicated to communication management, such as servers and routers, are not desired.

As related technology, a technology is proposed in which route metric is used for route detection. In addition, a technology is also proposed in which, when a metric value of a path is inspected, traffic on another path that shares a common node with the inspected path is taken into consideration.

Japanese National Publication of International Patent Application No. 2006-526937 and Japanese National Publication of International Patent Application No. 2003-536334 are examples of related art.

SUMMARY

According to an aspect of the invention, a node device receives first data communicated between the node device and adjacent node devices that are adjacent to the node device. The node device calculates a link cost between the node device and each of the adjacent node devices, based on the first data, and corrects the link cost using a first cost depending on communication performance of the each adjacent node device. The node device stores, in a memory, in association with the each adjacent node device, a first integrated link-cost value obtained by adding the corrected link cost to a second integrated link-cost value that is obtained by summing up link costs along a communication route from a destination node device serving as a final destination of second data to the each adjacent node device. The node device transmits, to the adjacent node devices, the first data including the second integrated link-cost value and a second cost depending on communication performance of the node device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a routing table, according to an embodiment;

FIG. 6 is a diagram illustrating an example of a Hello frame format, according to an embodiment;

FIG. 10 is a diagram illustrating an example of a link table, a routing table, and a Hello frame for a node device R5, according to an embodiment;

FIG. 11 is a diagram illustrating an example of a link table, a routing table, and a Hello frame for a node device R4, according to an embodiment;

FIG. 12 is a diagram illustrating an example of a link table, a routing table, and a Hello frame for a node device R3, according to an embodiment;

FIG. 13 is a diagram illustrating an example of a link table, a routing table, and a Hello frame for a node device R2, according to an embodiment;

FIG. 14 is a diagram illustrating an example of a link table, a routing table, and a Hello frame for a node device R1, according to an embodiment;

FIG. 15 is a diagram illustrating an example of a link table, a routing table, and a Hello frame for a node device A, according to an embodiment;

DESCRIPTION OF EMBODIMENT

In the ad hoc network, not all node devices may have the same communication performance. Communication speed changes depending on the communication performance of the node device. A path that is routed without consideration to the communication performance of the node device may not be an appropriate path.

Figure 1:
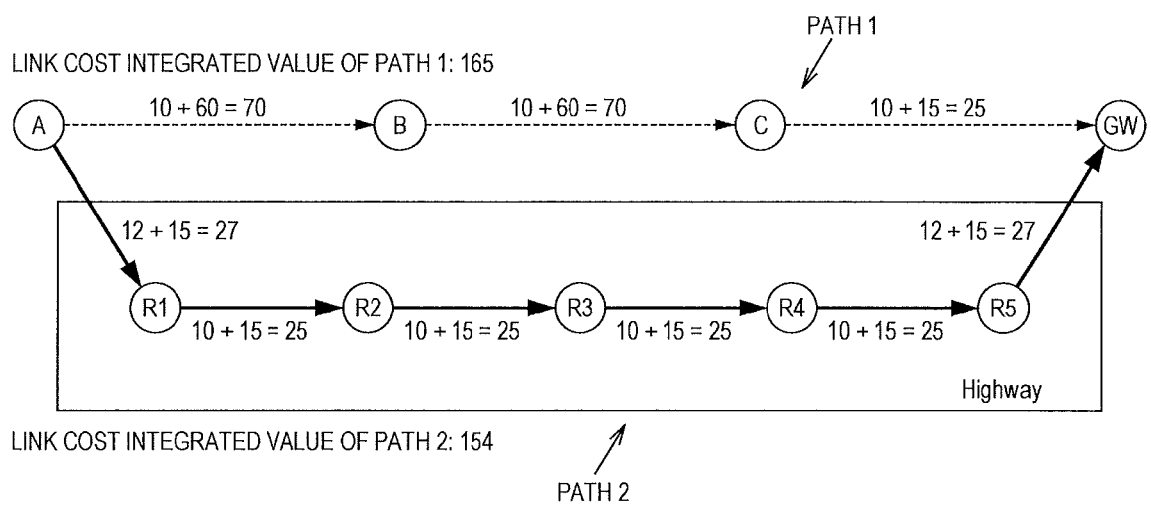
FIG. 1 is a diagram illustrating an example of an ad hoc network, according to an embodiment.

Hereinafter, an embodiment will be described with reference to the drawings. FIG. 1 is a diagram illustrating an example of an ad hoc network, according to an embodiment. In FIG. 1, the ad hoc network is composed of nine participating node devices: node devices A to C, node devices R1 to R5 (repeaters), and a gateway device GW. An example of the ad hoc network is not limited to that in FIG. 1.

In FIG. 1, an example of an ad hoc network having two paths is illustrated for the purpose of explanation. However, the embodiment may also be applied to an ad hoc network that has a larger number of complex paths. For example, the embodiment may also be applied to an ad hoc network in which the paths form a mesh topology.

FIG. 1 illustrates three types of node devices. The node devices A to C have low communication performance. For example, smart meters may be used as the node devices A to C. A smart meter is a measuring instrument for measuring the amount of use of electricity, gas, water, and the like, and provides a communication function. The measured value may be transmitted using the communication function.

The node devices are included in the ad hoc network. The communication format may be wireless communication or wired communication.

The node devices R1 to R5 are repeaters. The node device GW is a gateway device. Therefore, three types of node devices participate in the network: the smart meters, the repeaters, and the gateway device. FIG. 1 illustrates an example, and node devices other than these three types may also participate in the network.

As described above, the smart meter has low communication performance. On the other hand, the repeater and the gateway device have high communication performance. When the communication performance is low, communication speed becomes low. When the communication performance is high, communication speed becomes high. According to the embodiment, an example is given in which the repeaters and the gateway device have the same communication performance. However, communication performance may differ between the repeaters and the gateway device.

According to the embodiment, ad hoc communication is performed in frame units. A frame is a unit supported by a protocol. The frame is a Hello frame or a data frame, but is not limited thereto.

The Hello frame is communicated between adjacent node devices so that an appropriate path (route) may be selected in the ad hoc network. The data frame is data communicated over the ad hoc network. For example, the data frame includes information on electricity measured by the smart meter. The Hello frame is an example of first data, and the data frame is an example of second data.

The node devices configuring the network include a global source (GS) and a global destination (GD). The GS refers to a node device that is the transmission source of a frame. The GD refers to a node device that is the final destination of a frame. The GS may also be referred to as a global transmission source.

The node devices include a local source (LS) and a local destination (LD). From a viewpoint of a certain node device, the LD refers to an adjacent node device to which a frame is sent next from the certain node. The LS refers to a node device that is the direct transmission source transmitting a frame to the LD. The LS may also be referred to as a local transmission source.

Here, with reference to FIG. 1, ad hoc communication in which the node device A is the GS and the gateway device is the GD is assumed. In the ad hoc network, communication is performed between node devices that are adjacent to each other. An adjacent node device refers to a node device that is positioned within a range allowing direct reception of a frame transmitted from a certain node device. Therefore, the node devices adjacent to the node device A are the node device B and the node device R1.

As illustrated in FIG. 1, there are two paths (routes) over which communication is performed from the node device A to the gateway device (node device GW). One path, referred to as a path 1, goes through the node devices B and C. The other path, referred to as a path 2, goes through the repeaters, or in other words, the node devices R1 to R5. The path 2 is also referred to as a Highway.

According to the embodiment, the path to be selected is determined by a link cost integrated value of the path from the node device A to the node device GW. The link cost is a value, expressed by cost, indicating communication quality between a certain node device and the adjacent node device. Therefore, when the link cost is low, high-speed communication is possible. When the link cost is high, the communication speed is low.

In addition, a plurality of node devices are present between the node device A and the node device GW. There is a link cost between adjacent node devices. When one or more node devices are present on the path from the node device A to the node device GW, there are two or more link costs on the path. Therefore, a value obtained by integrating the link costs between node devices on the path is referred to as the link cost integrated value.

When the link cost integrated value is low, the communication speed from the GS to the GD is high. On the other hand, when the link cost integrated value is high, the communication speed from the GS to the GD is low. Therefore, a path having a low link cost integrated value is ordinarily selected. As illustrated in FIG. 1, the hop count of the path 1 is less than the hop count of the path 2. However, the link cost integrated value of the path 1 is "165", whereas the link cost integrated value of the path 2 is "154".

Therefore, in the case of determining a path from the node device A to the node device GW, the path 2 is selected. As described above, the node devices R1 to R5 on the path 2 are repeaters and capable of high-speed communication. Therefore, even when the hop count is large, the path 2 (Highway) is selected that goes through the node devices R1 to R5 which are repeaters having high communication performance.

The link cost may be obtained using the Hello frame. All node devices participating in the network transmit a Hello frame to all adjacent node devices. A node device that has received a Hello frame calculates the link cost between the node device that has transmitted the Hello frame and the node device that has received the Hello frame. The node device that is adjacent to a certain node device may be referred to as an adjacent node device. The certain node device may be referred to as an own node device.

As a method for calculating the link cost, an average value and a variance value of a received signal strength indicator (RSSI) of the Hello frame may be used. An average value and a variance value of reception cycles of the Hello frame may also be used. The method for obtaining the link cost is not limited to these methods.

The link cost obtained based on the RSSI and the reception cycle of the Hello frame is referred to as a pre-correction link cost (X in FIG. 1). According to the embodiment, a calculation is performed in which cost (also referred to, hereinafter, as a node device cost) Y based on the communication performance of the adjacent node device that has transmitted the Hello frame is added to the pre-correction link cost X.

Because the smart meter has a low communication speed, the node device cost Y of the smart meter is high. On the other hand, because the repeaters and the gateway device have a high communication speed, the node device cost Y of the repeaters and the gateway device is low.

A post-correction link cost Z is a value obtained by adding the node device cost Y to the pre-correction cost X ($Z=X+Y$). The post-correction link cost Z is an accurate link cost reflecting the communication speed of the node device.

Next, an example of a configuration of a node device participating in the network will be described with reference to FIG. 2. A node device 100 includes a receiving unit 101, a calculating unit 102, a correcting unit 103, a table managing unit 104, a link table 105, and a routing table 106. Furthermore, the node device 100 includes a node cost storage unit 107, a device state managing unit 108, a transmission processing unit 109, a timer 110, a transmitting unit 111, a frame processing unit 112, and a routing determining unit 113.

The receiving unit 101 receives a frame from an adjacent node device. The frame received by the receiving unit 101 is a Hello frame or a data frame. In FIG. 2, the Hello frame is indicated as "Hello" and the data frame is indicated as "Data".

The receiving unit 101 identifies whether the received frame is a Hello frame or a data frame. Then, the receiving unit 101 outputs the Hello frame to the calculating unit 102 and outputs the data frame to the frame processing unit 112.

The calculating unit 102 calculates the link cost between the adjacent node device that has transmitted the Hello frame and the node device 100 that has received the Hello frame, based on the Hello reception cycle average, the Hello reception cycle variance, the RSSI average, and the RSSI variance of the received Hello frame. The calculated link cost is the above-described pre-correction link cost X.

The correcting unit 103 performs correction by adding the node device cost Y included in the Hello frame to the pre-correction link cost X. In other words, the correcting unit 103 reflects the node device cost Y of the adjacent node device that has transmitted the Hello frame in the calculated pre-correction link cost X. The corrected link cost is the post-correction link cost Z. The post-correction link cost Z is "Z=X+Y".

The table managing unit 104 manages the link table 105 and the routing table 106. For example, the table managing unit 104 updates and references the link table 105 and the routing table 106.

Figure 3:
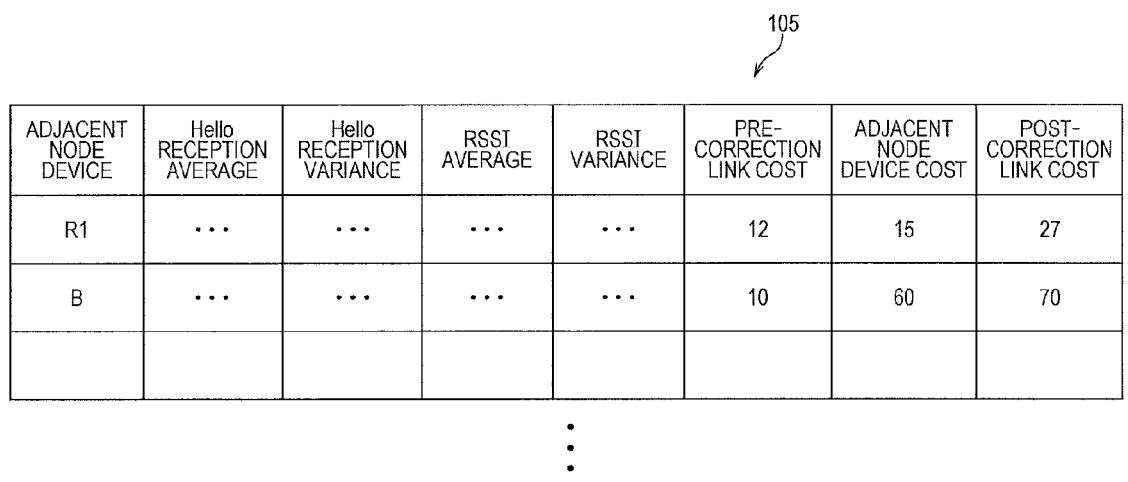
FIG. 3 is a diagram illustrating an example of a link table, according to an embodiment.

The link table 105 stores therein information related to node devices adjacent to the node device 100 in which the link table 105 is provided and information related to communication quality between the node devices. FIG. 3 illustrates an example of the elements in the link table 105. The link table 105 may, for example, be stored in an auxiliary storage device 124, described hereafter.

The example of the link table 105 illustrated in FIG. 3 includes eight fields: adjacent node device, Hello reception cycle average, Hello reception cycle variance, RSSI average, RSSI variance, pre-correction link cost, adjacent node device cost, and post-correction link cost. The eight fields are provided for each adjacent node. The fields in the link table 105 are not limited to those illustrated in FIG. 3.

The Hello reception cycle average, the Hello reception cycle variance, the RSSI average, and the RSSI variance are elements used to calculate the pre-correction link cost X. Therefore, specific numeric values are not indicated.

A Hello frame includes information on the adjacent node device that has transmitted the Hello frame. In addition, the Hello reception cycle average, the Hello reception cycle variance, the RSSI average, and the RSSI variance may be acquired from the Hello frame. As described above, the Hello frame includes information on the node device cost. In addition, the correcting unit 103 outputs the post-correction link cost Z. The above-described elements are stored in the link table 105 for each adjacent node device.

In the routing table 106, a single global destination (GD) node device is associated with a single or a plurality of arbitrary local destination (LD) node devices. In a manner similar to the link table 105, the routing table 106 may also be stored in the auxiliary storage device 124. The routing table 106 is an example of a storage unit.

FIG. 4 illustrates an example of the routing table 106 of the node device A. The routing table 106 in FIG. 4 illustrates an example in which three or less local destinations are able to be stored for a single global destination. However, the number of local destinations is not limited to three or less.

As illustrated in FIG. 1, the node device A has two adjacent node devices: the node device B and the node device R1. The routing table 106 includes three elements: the global destination (GD), the local destination (LD), and the link cost integrated value. The global destination is the node device GW that is a gateway device. Therefore, "GW" indicating the node device GW is stored as the global destination.

"R1" indicating the node device R1 and "B" indicating the node device B are stored as the local destination in the routing table 106. For example, when the local destination is the node device R1 (path 2), the link cost integrated value "154" is stored in association with the local destination node device R1. When the local destination is the node device B (path 1), the link cost integrated value "165" is stored in association with the local destination node device B.

Therefore, the link cost integrated value for each local destination is stored in the routing table 106.

The node cost storage unit 107 stores a cost (node device cost) depending on communication performance of the node device 100 in which the node cost storage unit 107 is provided. As described above, when the node device 100 in which the node cost storage unit 107 is provided is a smart meter, communication performance is low. Therefore, the node device cost is set at a high value. For example, when the node device 100 is a smart meter, the node device cost is set at "60".

In addition, when the node device 100 in which the node cost storage unit 107 is provided is a repeater or a gateway device, communication performance is high. Therefore, the node device cost is set at a low value. For example, when the node device 100 is a repeater or a gateway device, the node device cost is set at "15". In this example, the node device cost is "¼" of node device cost of the smart meter.

The node device cost of the node device 100 in which the node cost storage unit 107 is provided, stored in the node cost storage unit 107, may be fixed or variable. The device state managing unit 108 is able to change the value of the node device cost stored in the node cost storage unit 107. The device state managing unit 108 is an example of a changing unit.

For example, the device state managing unit 108 may change the node device cost to a higher value immediately after start-up of the node device 100, when congestion occurs, or when the node device 100 is driven by a battery. Details will be described hereafter.

The transmission processing unit 109 performs a transmission process by generating a Hello frame. The Hello frame is transmitted to the adjacent node devices via the transmitting unit 111 at a predetermined time interval. For this purpose, the timer 110 counts a predetermined amount of time that has been set. When the predetermined amount of time is reached, a signal is outputted to the transmission processing unit 109 for transmission of the Hello frame.

The transmission processing unit 109 broadcasts the Hello frame to all node devices adjacent to the node device 100 in which the transmission processing unit 109 is provided. At this time, the transmission processing unit 109 includes, in the Hello frame, the node device cost of the node device 100 in which the transmission processing unit 109 is provided.

From the perspective of the node device to which the Hello frame is transmitted, the node device cost of the node device 100 in which the transmission processing unit 109 is provided is the node device cost Y.

The routing table 106 stores therein a link cost integrated value for each local destination. Therefore, the transmission processing unit 109 references the routing table 106 and includes, in the Hello frame, the link cost integrated value associated with the local destination node device.

Next, the frame processing unit 112 will be described. When a data frame is received, the receiving unit 101 outputs the received data frame to the frame processing unit 112. The frame processing unit 112 performs a predetermined process on the data frame. Then, the data frame outputted from the frame processing unit 112 is inputted to the routing determining unit 113.

The routing determining unit 113 references the routing table 106 and determines the next local destination. At this time, the routing determining unit 113 preferably selects the local destination having the lowest link cost integrated value in the routing table 106. As a result of selection of the local destination having the lowest link cost integrated value in the routing table 106, the data frame is able to be transmitted at the highest speed to the node device GW (gateway device) that is the final destination.

The transmitting unit 111 then transmits the data frame to the local destination determined by the routing determining unit 113. Therefore, the transmitting unit 111 transmits two types of frames, the data frame and the Hello frame.

Figure 5:
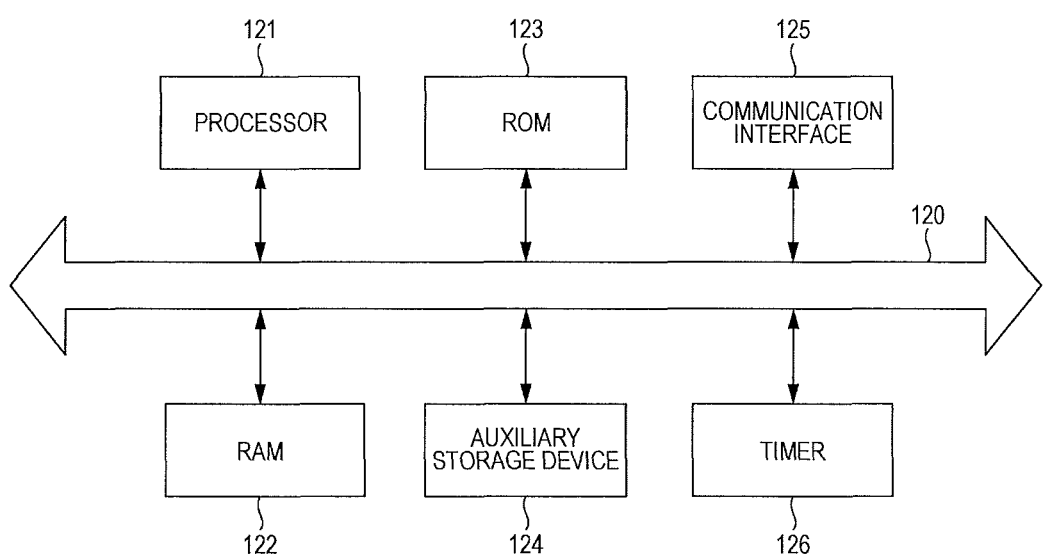
FIG. 5 is a diagram illustrating an example of a hardware configuration of a node device, according to an embodiment.

Next, a hardware configuration of the node device 100 will be described with reference to FIG. 5. As illustrated in FIG. 5, in the node device 100, a processor 121, a random access memory (RAM) 122, a read-only memory (ROM) 123, the auxiliary storage device 124, a communication interface 125, and a timer 126 are connected by a bus 120.

The processor 121 is an arbitrary processing circuit such as a central processing unit (CPU). The processor 121 executes a program that is loaded into the RAM 122. The ROM 123 is a non-volatile storage device that stores therein the program to be loaded into the RAM 122. The program to be loaded into the RAM 122 may also be stored in the auxiliary storage device 124. For example, a portable recording medium, a semiconductor memory, or a hard disk drive may be used as the auxiliary storage device 124. The auxiliary storage device is also referred to as a storage device.

The RAM 122, the ROM 123, and the auxiliary storage device 124 are all examples of a tangible computer-readable storage medium. Such tangible storage mediums are not temporary mediums such as signal carrier waves.

For example, the calculating unit 102, the correcting unit 103, the table managing unit 104, the device state managing unit 108, the transmission processing unit 109, the frame processing unit 112, and the routing determining unit 113 may be actualized by the processor 121. The link table 105, the routing table 106, and the node cost storage unit 107 may be actualized by the RAM 122, the ROM 123, or the auxiliary storage device 124. The receiving unit 101 and the transmitting unit 111 may be actualized by the communication interface 125.

The communication interface 125 is an interface device for communicating with other node devices. The receiving unit 101 and the transmitting unit 111 illustrated in FIG. 2 are included in the communication interface 125. The timer 126 is the same as the timer 110 illustrated in FIG. 2.

Next, the Hello frame will be described with reference to FIG. 6. The Hello frame illustrated in FIG. 6 includes an ad hoc header, time, a Hello message header, a plurality of Hello headers, a signature, and padding. The Hello frame in FIG. 6 is an example and is not limited thereto.

The ad hoc header includes information such as the local destination (LD), the local source (LS), the frame type, and the frame size. The Hello message header includes Hello information, a node device cost, and a device start-up progress counter. The numbers of bytes indicated in FIG. 6 are examples and are not limited thereto.

The Hello information includes information on the number of Hello headers. Each Hello header includes a GD address, a hop count, and a link cost integrated value. The GD address indicates a node device that is the final destination. The hop count indicates the number of node devices that are present along a path to the final destination node device. The link cost integrated value is as described above.

Figure 7:
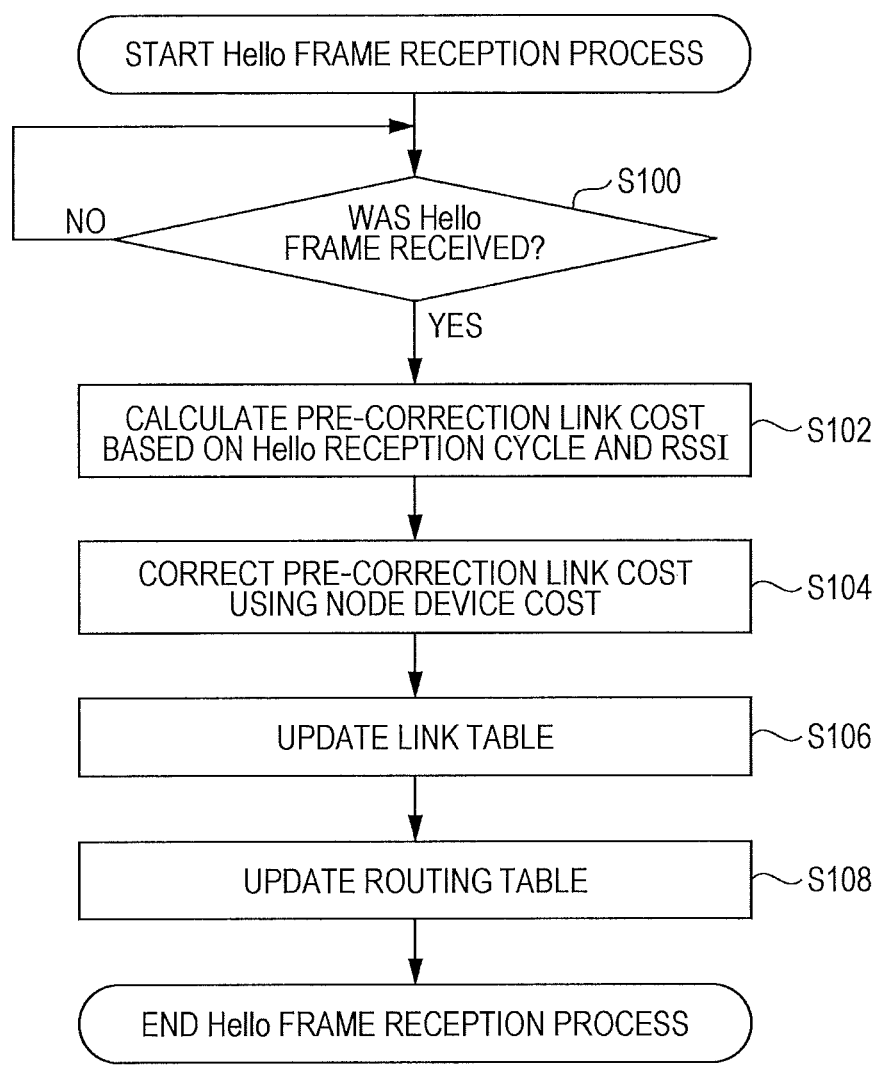
FIG. 7 is a diagram illustrating an example of an operational flowchart for a Hello frame reception process, according to an embodiment.

Next, a Hello frame reception process performed by the node device 100 will be described with reference to FIG. 7. The node device 100 determines whether or not a Hello frame is received (step S100). When the node device 100 has not received a Hello frame, the Hello frame reception process does not proceed to subsequent step S102.

When the receiving unit 101 of the node device 100 receives the Hello frame from an adjacent node device, the calculating unit 102 calculates the pre-correction link cost X based on the Hello reception cycle average, the Hello reception cycle variance, the RSSI average, and the RSSI variance (step S102).

The Hello frame includes the node device cost. The correcting unit 103 corrects the pre-correction link cost X by adding the node device cost Y (node device cost of the adjacent node device) to the pre-correction link cost X calculated by the calculating unit 102, thereby obtaining the post-correction link cost Z (step S104).

The table managing unit 104 updates the link table 105 (step S106). The Hello frame transmitted from the adjacent node device includes information identifying the adjacent node device. In addition, the Hello reception cycle average, the Hello reception cycle variance, the RSSI average, and the RSSI variance may be detected based on the received Hello frame.

The table managing unit 104 detects the node device cost Y that is included in the Hello frame. The table managing unit 104 acquires the post-correction link cost Z corrected by the correcting unit 103. Then, the table managing unit 104 is able to update each element in the link table 105 for each adjacent node device.

The table managing unit 104 updates the routing table 106 (step S108). The table managing unit 104 may add, as the LD in the routing table 106, information on the node devices adjacent to the node device 100 in which the table managing unit 104 is provided.

In addition, the table managing unit 104 references the link table 105. The link table 105 stores therein the post-correction link cost Z in association with the adjacent node device that has transmitted the Hello frame. Meanwhile, the Hello frame transmitted from the adjacent node device includes the link cost integrated value.

Here, the calculating unit 102 adds the post-correction link cost Z for the link cost, to the link cost integrated value in the Hello frame. The table managing unit 104 then stores the link cost integrated value to which the post-correction link cost Z has been added, in the routing table 106.

Figure 8:
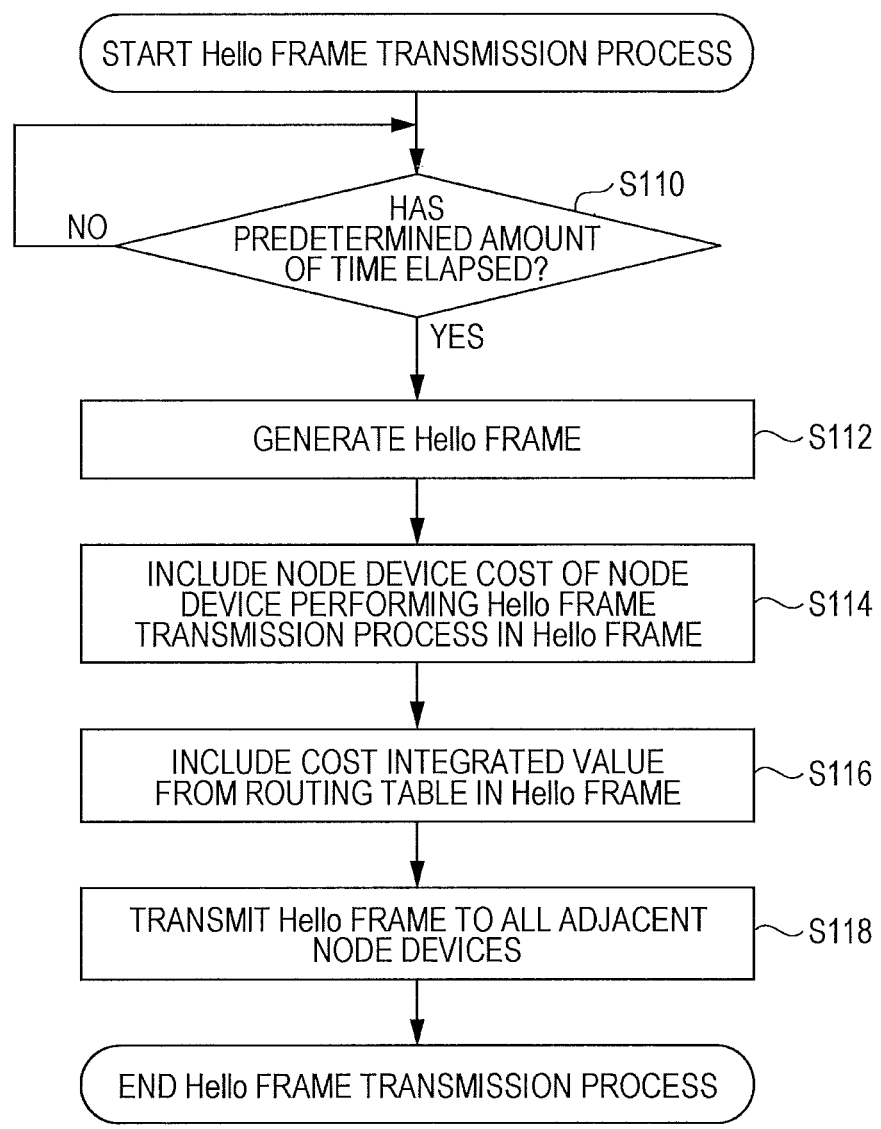
FIG. 8 is a diagram illustrating an example of an operational flowchart for a Hello frame transmission process, according to an embodiment.

Next, a Hello frame transmission process performed by the node device 100 will be described with reference to FIG. 8. The timer 110 of the node device 100 determines whether or not a predetermined amount of time has elapsed (step S110). When the predetermined amount of time has not elapsed, the Hello frame transmission process does not proceed to subsequent step S112.

When the timer 110 determines that the predetermined amount of time has been reached, a signal indicating that the predetermined amount of time has been reached is outputted to the transmission processing unit 109. The transmission processing unit 109 generates a Hello frame as depicted in FIG. 6 (step S112). At this time, the transmission processing unit 109 generates the Hello frame to be broadcast.

The transmission processing unit 109 references the node cost storage unit 107 and includes, in the Hello frame, the node device cost of the node device 100 in which the transmission processing unit 109 is provided (step S114). From the perspective of the node device adjacent to the node device 100 in which the transmission processing unit 109 is provided, the node device cost included in the Hello frame at step S114 is the node device cost Y transmitted from an adjacent node device.

Next, the transmission processing unit 109 references the routing table 106 and includes the link cost integrated value corresponding to the next local destination in the Hello frame (step S116). The process at step S116 may be performed before step S114.

After the above-described step S114 and step S116 are performed, the transmission processing unit 109 transmits the Hello frame to all nodes adjacent to the node device 100 in which the transmitting processing unit 109 is provided (step S118).

The Hello frame reception process and transmission process performed by the node device 100 are as described above. In the ad hoc network, all node devices participating in the network perform the Hello frame reception process and transmission process.

Figure 9:
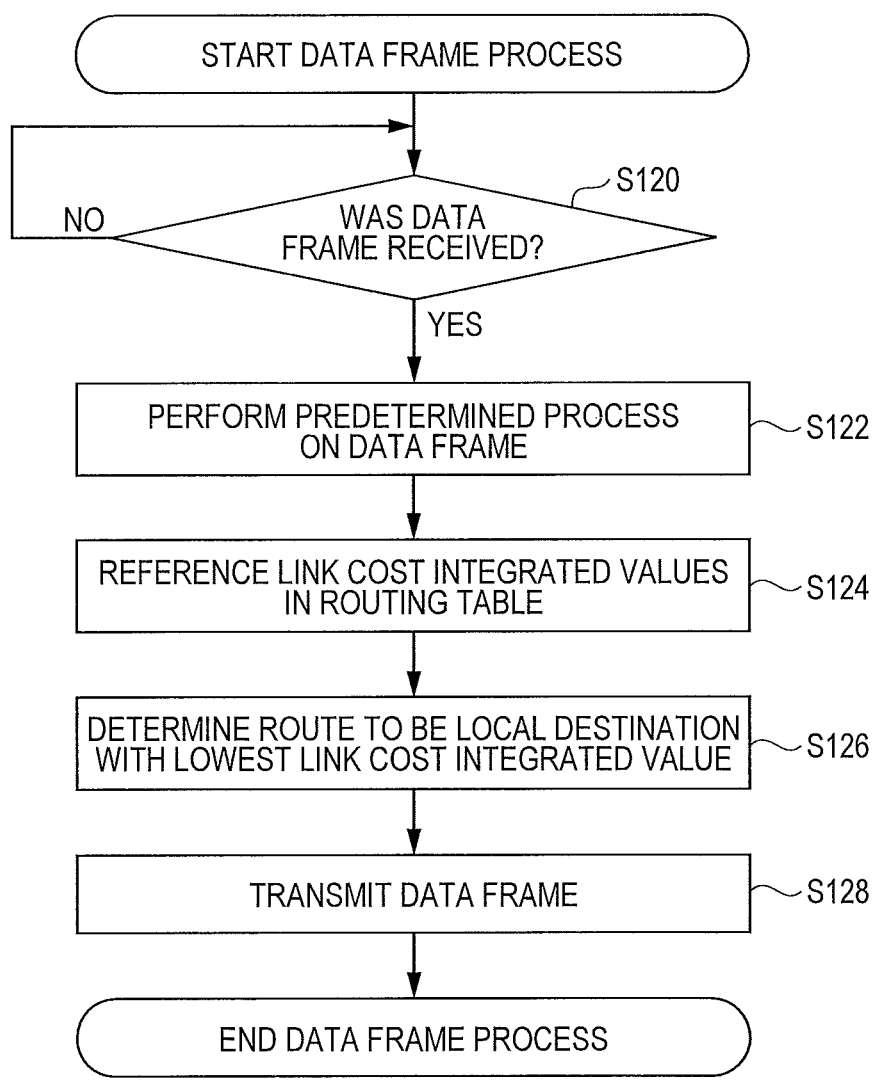
FIG. 9 is a diagram illustrating an example of an operational flowchart for a data frame process, according to an embodiment.

Next, a data frame process performed by the node device 100 will be described with reference to FIG. 9. The receiving unit 101 of the node device 100 determines whether or not a data frame is received (step S120). The data frame process does not proceed to subsequent step S122 until the receiving unit 101 receives a data frame.

When the receiving unit 101 receives a data frame, the data frame is outputted to the frame processing unit 112. Then, the frame processing unit 112 performs a predetermined process on the data frame (step S122) and outputs the processed data frame to the routing determining unit 113.

The routing determining unit 113 references the routing table (step S124). The routing determining unit 113 then selects the local destination (LD) having the lowest link cost integrated value and determines the route for the data frame (step S126).

The transmitting unit 111 transmits the data frame to the local destination (LD) node device determined by the routing determining unit 113 (step S128). The data frame process by the node device 100 is thereby completed.

A plurality of node devices participate in the network. In each node device, the routing determining unit 113 determines the appropriate route for transmitting the data frame to the global destination (GD).

Next, a specific example of path determination using the Hello frame will be described. The ad hoc network illustrated in FIG. 1 will be used as an example of an ad hoc network. The global source (GS) is the node device A. The node device A is a smart meter. In this example, the node device A transmits information on measured electricity by using a data frame. However, the node device A is not limited to a smart meter that measures electricity. In addition, the global destination (GD) that is the final destination is the node device GW.

As described above, the nine node devices A to C, R1 to R5, and GW participating in the network transmit Hello frames to the respective adjacent node devices. Here, focus is first placed on the node device GW. The node device GW is a gateway device and the global destination.

The node devices adjacent to the node device GW are the node device C and the node device R5. Here, the node device GW broadcasts the Hello frame. The node device R5 and the node device C that are the adjacent node devices receive the Hello frame.

FIG. 10 illustrates an example of a link table 105 (in part) and a routing table 106 of the node device R5, and a Hello frame transmitted from the node device R5, according to an embodiment. The link table 105 of the node device R5 stores therein information on the adjacent node device, the pre-correction link cost, the node device cost, and the post-correction link cost.

Assuming that the node device R5 is the node device 100, the calculating unit 102 of the node device 100 calculates the pre-correction link cost X between the adjacent node device GW and the node device 100 in which the calculating unit 102 is provided. Here, the pre-correction link cost X is "12".

The Hello frame includes the node device cost Y of the adjacent node device GW. Here, the node device cost Y is "15". Therefore, the correcting unit 103 adds the node device cost Y to the pre-correction link cost X. The post-correction link cost Z becomes "27". These values are stored in the link table 105.

The routing table 106 stores therein information on the node device GW and the node device R4 as the LD. Here, the link cost integrated value of the node device R4 is not indicated because focus is being placed on the node device GW. However, the link cost integrated value is also stored for the link cost of the node device R4.

When the node device GW is the LD, the link cost integrated value is stored as "27". Because the node device R5 is a node device adjacent to the node device GW, an integrated link cost is not present. The integrated link cost may be set at zero. Therefore, the link cost integrated value is the same value as the post-correction link cost Z.

The transmission processing unit 109 generates the Hello frame to be transmitted to the node device R4 and the node device GW. At this time, the transmission processing unit 109 references the routing table 106 and includes the information on the link cost integrated value "27" and the hop count "1" in the Hello frame. In addition, the transmission processing unit 109 includes, in the Hello frame, the cost "15" that is dependent on the communication performance of the node device R5 and stored in the node cost storage unit 107. Then, the transmission processing unit 109 broadcasts the Hello frame. The node device R4 and the node device GW that are the adjacent node devices receive the Hello frame.

Next, the node device R4 will be described with reference to FIG. 11. Assuming that the node device R4 is the node device 100, the adjacent node devices are the node device R3 and the node device R5. The link table 105 of the node device R4 stores therein the pre-correction link cost X, the node device cost Y, and the post-correction link cost Z for each of the node devices R3 and R5.

Here, focus is placed on the adjacent node device R3. The pre-correction link cost X calculated by the calculating unit 102 is "10". The node device cost Y is "15". The node device link cost Y is the node device cost that ha been included in the Hello frame by the node device R5. Then, the post-correction link cost corrected by the correcting unit 103 becomes "25". The post-correction link cost "25" is stored in the link table 105.

The calculating unit 102 adds the post-correction link cost "25" to the link cost integrated value "27" that is included in the Hello frame transmitted from the node device R5. As a result, the link cost integrated value corresponding to the LD being the node device R5 in the routing table 106 becomes "52 (=27+25)".

The transmission processing unit 109 generates a Hello frame. The transmission processing unit 109 references the routing table 106 and includes the information on the link cost integrated value "52" in the Hello frame. In addition, the transmission processing unit 109 includes, in the Hello frame, the node device cost "15" based on the communication performance of the node device R4 stored in the node cost storage unit 107, and the hop count "2". Then, the transmission processing unit 109 broadcasts the Hello frame. The adjacent node devices R3 and R5 receive the Hello frame.

Next, the node device R3 will be described with reference to FIG. 12. The node devices adjacent to the node device R3 are the node device R4 and the node device R2. When focus is placed on the adjacent node device R4, the pre-correction link cost X calculated by the calculating unit 102 is "10". In addition, the node device cost Y of the adjacent node device R4 is "15". Therefore, the post-correction link cost Z becomes "25". The post-correction link cost Z "25" is stored in the link table 105.

The calculating unit 102 adds the post-correction link cost "25" to the link cost integrated value "52" included in the Hello frame transmitted from the node device R4. As a result, the link cost integrated value corresponding to the LD being the node device R4 in the routing table 106 becomes "77 (=52+25)".

The transmission processing unit 109 generates a Hello frame. The transmission processing unit 109 references the routing table 106 and includes, in the Hello frame, the information on the link cost integrated value "77" and the hop count "3". In addition, the transmission processing unit 109 includes therein the node device cost "15" of the node device R3 stored in the node cost storage unit 107. Then, the transmission processing unit 109 broadcasts the Hello frame. The adjacent node devices R2 and R4 receive the Hello frame.

Next, the node device R2 will be described with reference to FIG. 13. The node devices adjacent to the node device R2 are the node device R3 and the node device R1. When focus is placed on the adjacent node device R3, the pre-correction link cost X calculated by the calculating unit 102 is "10". In addition, the node device cost Y of the adjacent node device R3 is "15". Therefore, the post-correction link cost Z becomes "25". The post-correction link cost Z "25" is stored in the link table 105.

The calculating unit 102 adds the post-correction link cost "25" to the link cost integrated value "77" included in the Hello frame transmitted from the node device R3. As a result, the link cost integrated value corresponding to the LD being the node device R3 in the routing table 106 becomes "102 (=77+25)".

The transmission processing unit 109 generates a Hello frame. The transmission processing unit 109 references the routing table 106 and includes, in the Hello frame, the information on the link cost integrated value "102" and the hop count "4". In addition, the transmission processing unit 109 includes therein the node device cost "15" of the node device R2 stored in the node cost storage unit 107. Then, the transmission processing unit 109 broadcasts the Hello frame. The adjacent node devices R1 and R3 receive the Hello frame.

Next, the node device R1 will be described with reference to FIG. 14. The node devices adjacent to the node device R1 are the node device R2 and the node device A. When focus is placed on the adjacent node device R2, the pre-correction link cost X calculated by the calculating unit 102 is "10". In addition, the node device cost Y of the adjacent node device R2 is "15". Therefore, the post-correction link cost Z becomes "25". The post-correction link cost Z "25" is stored in the link table 105.

The calculating unit 102 adds the post-correction link cost "25" to the link cost integrated value "102" included in the Hello frame. As a result, the link cost integrated value corresponding to the LD being the node device R2 in the routing table 106 becomes "127 (=102+25)".

The transmission processing unit 109 generates a Hello frame. The transmission processing unit 109 references the routing table 106 and includes, in the Hello frame, the information on the link cost integrated value "127" and the hop count "5". In addition, the transmission processing unit 109 includes therein the node device cost "15" based on the communication performance of the node device R1 stored in the node cost storage unit 107. Then, the transmission processing unit 109 broadcasts the Hello frame. The adjacent node devices A and R2 receive the Hello frame.

Next, the node device A will be described with reference to FIG. 15. The node devices adjacent to the node device A are the node device R1 and the node device B. When focus is placed on the adjacent node device R1, the pre-correction link cost X calculated by the calculating unit 102 is "12". In addition, the node device cost Y of the adjacent node device R1 is "15". Therefore, the post-correction link cost Z becomes "27". The post-correction link cost Z "27" is stored in the link table 105.

The calculating unit 102 adds the post-correction link cost "27" to the link cost integrated value "127" included in the Hello frame transmitted from the node device R1. As a result, the link cost integrated value corresponding to the LD being the node device R1 in the routing table 106 becomes "154 (=127+27)".

Therefore, the node device A is able to store the link cost integrated value "154" of the path 2 in the routing table 106. In other words, the node device A is able to store, in the routing table 106, a value obtained by adding the post-correction link cost "27" to the link cost integrated value "127" from the final destination of the node device GW to the adjacent node device R1, as the integrated value "154".

A similar process is also performed for the path 1. In other words, a link cost integrated value "165" from the node device GW to the node device A via the node device C and the node device B, is acquired. The link cost integrated value "165" is stored in the routing table 106.

As illustrated in FIG. 1, when the node device A is the GS and the node device GW is the GD, a data frame may be transmitted from the node device A to the node device GW via either the path 1 or the path 2.

At this time, the routing determining unit 113 of the node device A references the routing table 106. In the routing table 106, the node device R1 and the node device B are stored as the LD. The routing determining unit 113 determines the node device R1 having the lower link cost integrated value as the next node device. In other words, the path 2 is selected.

As described above, the path 1 has a lower hop count than the path 2. However, the path 1 is composed of the node devices B and C (in other words, smart meters) that have a low communication speed. When the cost based on communication performance of the node devices B and C is considered, the path 1 has a higher link cost integrated value though the hop count is lower.

On the other hand, the path 2 has a higher hop count than the path 1. However, the node devices R1 to R5 are repeaters and have a high communication speed. In other words, the cost based on communication performance of the node devices is low. Therefore, the path 2 has a lower link cost integrated value than the path 1 though the hop count is higher.

The path 2 is a Highway that includes the node devices R1 to R5 that have high-speed communication performance. The link cost integrated value is used to guide the data frame to the Highway when selecting a path for transmitting the data frame.

However, the path 2 that is the Highway is not selected at all times. For example, when another node (repeater) participates in the path 2, the link cost integrated value of the path 1 becomes lower than that of the path 2. In this instance, when the data frame is transmitted from the node device A to the node device GW, the path 1 going through the node devices B and C having a low communication speed is selected.

Therefore, according to the embodiment, the link cost integrated value is taken into consideration in the routing from a node device of the GS to a node device of the GD among the plurality of node devices participating in the network. In the link cost integrated value, consideration is given to the node device cost based on communication performance of the node devices present on the path, thereby allowing appropriate routing. As a result of appropriate routing being performed, the data frame may be quickly delivered from a node device of the GS to a node device of the GD.

As a result, for example, the information on electricity measured by the smart meter may be quickly transmitted to a final destination of the gateway device.

In the example illustrated in FIG. 1, the network has the path 1 and the path 2. However, for example, a case may be assumed in which another path is further present that connects the node device R2 and the node device B. In this case, the routing determining unit 113 of the node device R2 references the routing table 106.

The routing table 106 of the node device R2 stores therein the node device B, in addition to the node device R3, as the local destination. The link cost integrated value of the node device R3 and the link cost integrated value of the node device B are also stored in the routing table 106.

At this time, the path 2 that goes through the node device R3 is the Highway and has a lower link cost integrated value than the path that goes through the node device B. Therefore, the routing determining unit 113 of the node device R2 selects the node device R3, rather than the node device B, as the local destination. The data frame is transmitted from the node device R2 to the node device R3.

Figure 2:
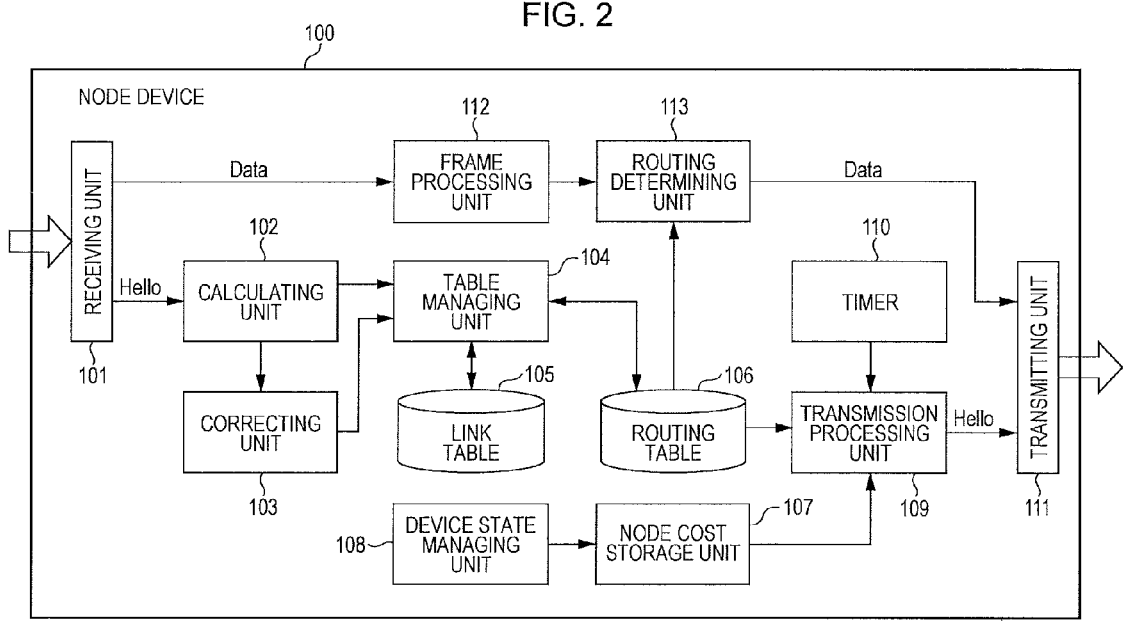
FIG. 2 is a diagram illustrating an example of a configuration of a node device, according to an embodiment.

Next, an example will be described in which the device state managing unit 108 illustrated in FIG. 2 is used. The device state managing unit 108 manages the state of the node device 100. The device state managing unit 108 changes the cost based on communication performance of the node device 100 stored in the node cost storage unit 107, depending on the state of the node device 100.

A first example in which the device state managing unit 108 changes the cost will be described. In the first example, the cost stored in the node cost storage unit 107 is increased immediately after start-up of the node device 100.

At start-up of the node device 100, the communication environment is unstable, and the node device 100 may be unsuitable for use. In such instances, the device state managing unit 108 sets the node device cost stored in the node cost storage unit 107 at a value higher than the original cost (the cost based on communication performance of the node device 100), immediately after start-up of the node device 100.

As a result, the post-correction link cost Z increases, and it becomes unlikely to select a path using the node device 100 immediately after start-up. When the value of the cost in the node cost storage unit 107 is set at a very high value, the possibility of the node device 100 being used is further reduced.

A second example is a case where the node device 100 is driven by a battery. Power is consumed when the node device 100 performs communication. Therefore, when the node device 100 is driven by a battery, communication becomes unstable depending on the power consumption state.

Therefore, when the node device 100 is driven by a battery, the device state managing unit 108 sets the node device cost stored in the node cost storage unit 107 at a value higher than the original cost (the cost based on the communication performance of the node device 100). As a result, selection of the path using the node device 100 becomes less likely.

A third example is a case where a failure occurs in the node device 100. In this case, it is preferable to select a path that does not use the node device 100. Therefore, the device state managing unit 108 sets the node device cost stored in the node cost storage unit 107 at a value higher than the original cost (the cost based on the communication performance of the node device 100).

In particular, in the third example, because a failure has occurred in the node device 100, it is preferable to select another path. Therefore, the device state managing unit 108 preferably sets the node device cost stored in the node cost storage unit 107 at an excessively high value so that the node device 100 is not used.

Figure 16A:
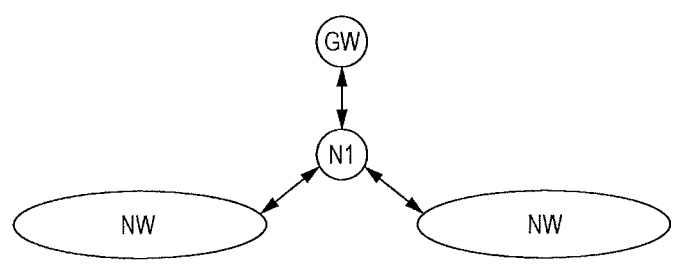
FIGS. 16A and 16B are diagrams illustrating an example in which a node device enters a congested state, according to an embodiment.

A fourth example is a case where the node device 100 is in a congested state. The fourth example will be described with reference to FIGS. 16A and 16B. FIG. 16A illustrates a state in which a node device N1 is in a congested state as a result of paths converging on the node device N1. In other words, communication from two networks NW and the node device GW (gateway device) is concentrated on the node device 100 (node device N1 in FIG. 16A).

Figure 16B:
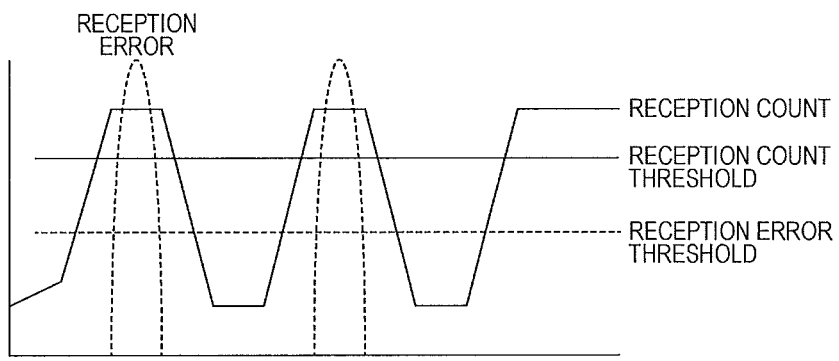

When paths excessively converge on the node device N1 in this way, communication exceeding the processing capacity of the node device N1 occurs. Therefore, the communication quality of the overall network deteriorates. FIG. 16B illustrates a frame reception count (solid line) and reception errors (dotted line) of the frames received by the node device N1.

The reception count and the reception errors both exceed the respective thresholds (reception count threshold and reception error threshold). In other words, communication exceeding the processing capacity of the node device N1 is concentrated on the node device N1.

The device state managing unit 108 detects a congested state when the paths converge on the node device N1 and the node device N1 is in a congested state in this way. When the node device N1 is in the congested state, the device state managing unit 108 sets the cost stored in the node cost storage unit 107 at a value higher than the original cost.

Figure 17A:
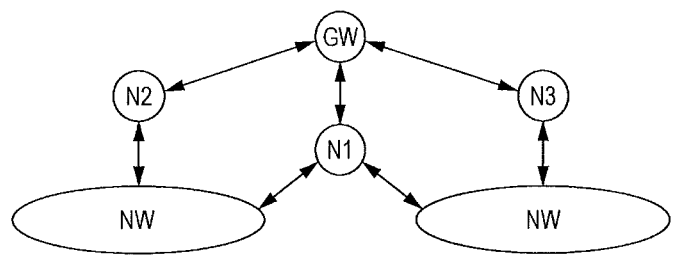
FIGS. 17A and 17B are diagrams illustrating an example in which a node device is released from a congested state, according to an embodiment.

As a result, the link cost integrated value of the path that goes through the node device N1 becomes high. Therefore, selection of the path that goes through the node device N1 becomes unlikely, and communication is dispersed to other paths. FIG. 17A illustrates a state in which communication is dispersed to other paths.

In the network in FIG. 17A, paths that go through node devices N2 and N3 are also selected, in addition to the path that goes through the node device N1. As a result, communication is no longer concentrated on the node device N1, but is dispersed to the node devices N2 and N3.

Figure 17B:
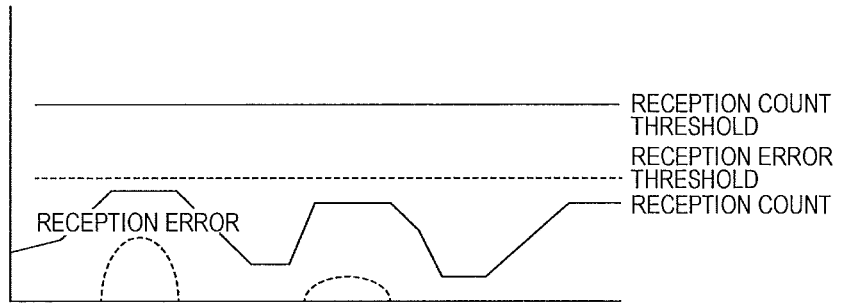

In a manner similar to FIG. 16B, FIG. 17B illustrates a frame reception count (solid line) and reception errors (dotted line) of the frames received by the node device N1. As illustrated in FIG. 17B, the reception count and the reception errors both fall below the respective thresholds. Therefore, the node device N1 is capable of stable communication.

In this case, the device state managing unit 108 sets the node device cost stored in the node cost storage unit 107 at a value higher than the original cost, depending on the state of congestion of the node device N1. Therefore, the paths for communication are dispersed from the node device N1 to the other node devices N2 and N3. In other words, because a part of the communication handled by the node device N1 is dispersed to the node devices N2 and N3, the node device N1 is released from the congested state. As a result, the network becomes capable of stable communication.

The original cost described in the first to fourth examples refers to the cost based on communication performance of the node device 100. The original cost may be stored as an initial value in the node cost storage unit 107 in advance.

Figure 18:
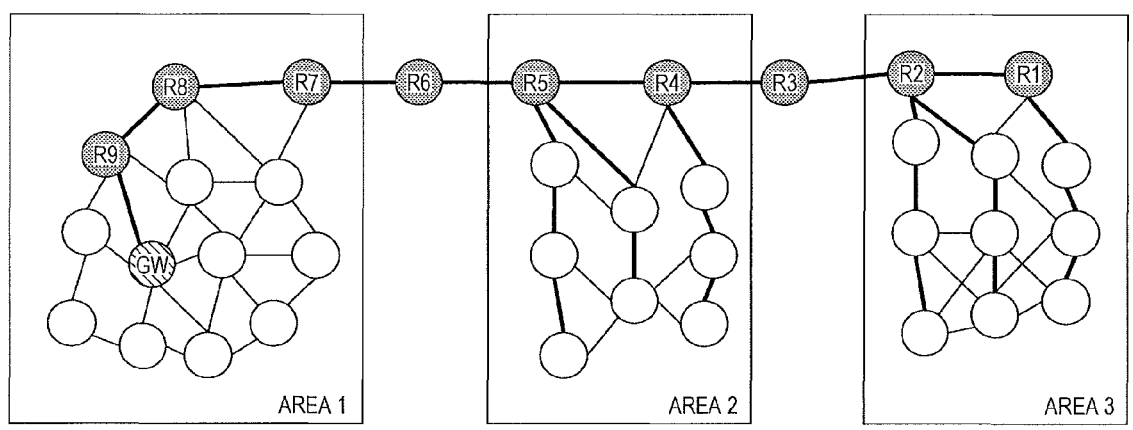
FIG. 18 is a diagram illustrating another example of an ad hoc network, according to an embodiment.

Next, an example of an ad hoc network differing from that in FIG. 1 will be described with reference to FIG. 18. The network in FIG. 18 is divided into three areas: area 1, area 2, and area 3. In FIG. 18, node devices R1 to R9 that are shaded by dots are repeaters. The node device GW that is shaded by hatch lines is a gateway device. The remaining node devices are smart meters.

In FIG. 18, the Highway is configured by a path that goes through the node devices R1 to R9. The node devices (smart meters) in the area 2 and the area 3 guide data frames to the Highway to shorten the time for transmission to the gateway device.

This is because the routing tables 106 of the node devices in the area 2 and the area 3 store therein the link cost integrated values. Among the single or plurality of local destinations associated with the gateway device, the link cost integrated value is the lowest for a local destination along a path leading to the node device GW (gateway) via the Highway.

Therefore, as indicated by the heavy line in FIG. 18, the path that leads to the node device GW via the Highway is selected for the data frames transmitted from the node devices (smart meters). Therefore, a more appropriate routing becomes possible.

The disclosed embodiment and advantages thereof have been described in detail. However, a person skilled in the art may make various modifications, additions, and omissions without departing from the scope of the embodiment clearly recited in the scope of claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A node device comprising:
a memory; and
a processor coupled to the memory and configured to:
receive first data communicated between the node device and adjacent node devices that are adjacent to the node device;
calculate a link cost between the node device and each of the adjacent node devices, based on the first data;
correct the link cost by adding a first cost to the link cost, the first cost depending on communication performance of the each adjacent node device, the first cost being held as a predetermined value by the each adjacent node device and being included in the first data by the each adjacent node device that has transmitted the first data to the node device;
store in the memory, in association with each of the adjacent node devices, a first integrated link-cost value obtained by adding the link cost corrected by the corrector to a second integrated link-cost value, the second integrated link-cost value being obtained by summing up link costs along a communication route from a destination node device serving as a final destination of second data to the each adjacent node device; and
transmit, to the adjacent node devices, the first data including the first integrated link-cost value and a second cost depending on communication performance of the node device.

2. The node device of claim 1, wherein the processor is further configured to select, by referencing the memory, one of the adjacent node devices that is associated with the second integrated link-cost value lowest among the adjacent node devices, as an adjacent node device via which the second data is to be transmitted from the node device to the destination node device.

3. The node device of claim 1, wherein the processor is further configured to change the second cost.

4. The node device of claim 3, wherein
when the node device is started up, the processor changes the second cost so that a value of the changed second cost is higher than an original value of the second cost.

5. The node device of claim 3, wherein
when the node device is driven by a battery, the processor changes the second cost so that a value of the changed second cost is higher than an original value of the second cost.

6. The node device of claim 3, wherein
when the node device is in a congested state, the processor changes the second cost so that a value of the changed second cost is higher than an original value of the second cost.

7. The node device of claim 3, wherein
when a failure occurs in the node device, the processor changes the second cost so that a value of the changed second cost is higher than an original value of the second cost.

8. The node device of claim 1, wherein
the first data is a Hello frame and the second data is a data frame.

9. The node device of claim 8, wherein the calculator processor is further configured to calculate the link cost based on an average value of reception signal strength of the Hello frame, a variance value of the reception signal strengths of the Hello frame, an average value of the reception cycles of the Hello frame, and a variance value of the reception cycles of the Hello frame.

10. The node device of claim 9, wherein
the node device is configured as a smart meter, and
the second data includes information on a measured value of an amount of use of any one of electricity, gas, or water.

11. A communication system comprising:
a plurality of node devices, wherein
each node device is configured:
to receive first data communicated between the each node device and adjacent node devices that are adjacent to the each node device,
to calculate a link cost between the each node device and each of the adjacent node devices, based on the first data;
to correct the link cost by adding a first cost to the link cost, the first cost depending on communication performance of the each adjacent node device, the first cost being held as a predetermined value by the each adjacent node device and being included in the first data by the each adjacent node device that has transmitted the first data to the node device;
to store, in a memory provided for the each node device, in association with the each adjacent node device, a first integrated link-cost value obtained by adding the corrected link cost to a second integrated link-cost value, the second integrated link-cost value being obtained by summing up link costs along a communication route from a destination node device serving as a final destination of second data to the each adjacent node device; and
to transmit, to the adjacent node devices, the first data including the second integrated link-cost value and a second cost depending on communication performance of the each node device.

12. A non-transitory, computer-readable recording medium having stored therein a program for causing a computer included in a node device to perform a process comprising:
receiving first data communicated between the node device and adjacent node devices that are adjacent to the node device,
calculating a link cost between the node device and each of the adjacent node devices, based on the first data;
correcting the link cost by adding a first cost to the link cost, the first cost depending on communication performance of the each adjacent node device, the first cost being held as a predetermined value by the each adjacent node device and being included in the first data by the each adjacent node device that has transmitted the first data to the node device;
storing, in a memory provided for the node device, in association with the each adjacent node device, a first integrated link-cost value obtained by adding the corrected link cost to a second integrated link-cost value, the second integrated link-cost value being obtained by summing up link costs along a communication route from a destination node device serving as a final destination of second data to the each adjacent node device; and
transmitting, to the adjacent node devices, the first data including the second integrated link-cost value and a second cost depending on communication performance of the node device.

13. A method being performed by a node device, the method comprising:
receiving first data communicated between the node device and adjacent node devices that are adjacent to the node device,
calculating a link cost between the node device and each of the adjacent node devices, based on the first data;
correcting the link cost by adding a first cost to the link cost, the first cost depending on communication performance of the each adjacent node device, the first cost being held as a predetermined value by the each adjacent node device and being included in the first data by the each adjacent node device that has transmitted the first data to the node device;
storing, in a memory provided for the node device, in association with the each adjacent node device, a first integrated link-cost value obtained by adding the corrected link cost to a second integrated link-cost value, the second integrated link-cost value being obtained by summing up link costs along a communication route from a destination node device serving as a final destination of second data to the each adjacent node device; and
transmitting, to the adjacent node devices, the first data including the second integrated link-cost value and a second cost depending on communication performance of the node device.

* * * * *